United States Patent
Gokcek

(10) Patent No.: US 11,420,634 B2
(45) Date of Patent: Aug. 23, 2022

(54) KALMAN FILTER BASED ROAD GRADE ESTIMATION METHOD USING ACCELEROMETER, GYROSCOPE, AND VEHICLE VELOCITY

(71) Applicant: Cevat Gokcek, Belleville, MI (US)

(72) Inventor: Cevat Gokcek, Belleville, MI (US)

(73) Assignee: FCA US LLC, Auburn Hills, MI (US)

( * ) Notice: Subject to any disclaimer, the term of this patent is extended or adjusted under 35 U.S.C. 154(b) by 96 days.

(21) Appl. No.: 16/829,434

(22) Filed: Mar. 25, 2020

(65) Prior Publication Data

US 2021/0300383 A1 Sep. 30, 2021

(51) Int. Cl.
| | |
|---|---|
| *B60W 40/076* | (2012.01) |
| *B60W 40/107* | (2012.01) |
| *B60W 40/105* | (2012.01) |
| *B60W 50/00* | (2006.01) |

(52) U.S. Cl.
CPC ........ *B60W 40/076* (2013.01); *B60W 40/105* (2013.01); *B60W 40/107* (2013.01); *B60W 2050/0031* (2013.01); *B60W 2050/0052* (2013.01); *B60W 2520/105* (2013.01); *B60W 2520/16* (2013.01)

(58) Field of Classification Search
CPC .......... G05B 2219/41146; G05B 2219/37331; G05B 23/0254; B60W 40/076
See application file for complete search history.

(56) References Cited

U.S. PATENT DOCUMENTS

| | | | | |
|---|---|---|---|---|
| 6,535,114 | B1 * | 3/2003 | Suzuki | G06T 7/70 348/148 |
| 8,793,035 | B2 * | 7/2014 | Yu | B60W 40/076 701/1 |
| 9,454,508 | B2 * | 9/2016 | Yu | G06F 17/00 |
| 9,725,093 | B2 * | 8/2017 | Chunodkar | B60W 40/076 |
| 2012/0209520 | A1 * | 8/2012 | Ingvalson | G01C 21/165 701/510 |
| 2016/0332633 | A1 * | 11/2016 | Raffone | B60W 40/13 |

(Continued)

OTHER PUBLICATIONS

Klomp et al., Longitudinal Velocity and Road Slope Estimation in Hybrid Electric Vehicles Employing Early Detection of Excessive Wheel Slip, 2014, Vehicle System Dynamics (Year: 2014).*

(Continued)

*Primary Examiner* — Russell Frejd
*Assistant Examiner* — Sara J Lewandroski
(74) *Attorney, Agent, or Firm* — Ralph E. Smith

(57) ABSTRACT

Kalman filter based road grade estimation techniques use models of a longitudinal accelerometer, an angular pitch rate gyroscope, and a velocity sensor and their outputs, and fuses the sensor measurements to optimally estimate the road grade. The proposed Kalman filter formulation is unique in that it uses a mathematical model of the sensors where the gyroscope output is considered as the input and the combined accelerometer and velocity sensor output is considered as the output of the model whose states are to be estimated. By using this unique second-order state space model, a Kalman filter based estimation algorithm is developed to estimate road grade accurately in real-time. This estimated road grade is then being utilized by various vehicle efficiency and/or safety systems to improve vehicle efficiency and/or vehicle safety.

16 Claims, 3 Drawing Sheets

(56) References Cited

U.S. PATENT DOCUMENTS

2019/0061457 A1* 2/2019 Takahashi ............... B60T 8/174
2019/0283760 A1* 9/2019 Jensen .................. B60W 40/10

OTHER PUBLICATIONS

Jauch, Jens, et al., "Road Grade Estimation With Vehicle-Based Inertial Measurement Unit and Orientation Filter", IEE Sensors Journal, vol. 18, No. 2, p. 781-789. (Jan. 15, 2018).

* cited by examiner

KALMAN FILTER BASED ROAD GRADE ESTIMATION METHOD USING ACCELEROMETER, GYROSCOPE, AND VEHICLE VELOCITY

FIELD

The present application generally relates to vehicle road grade estimation and, more particularly, to Kalman filter based road grade estimation techniques using an accelerometer, a gyroscope, and vehicle velocity.

BACKGROUND

Road grade is an important factor for many vehicle safety and efficiency systems. There is not a way, however, to directly measure road grade. Conventional vehicle road grade estimation techniques may be inaccurate/noisy/unreliable and/or slow, and thus often require additional resources (additional sensors, such as global positioning satellite (GPS) sensors, additional processor throughput, etc.). This in turn increases vehicle costs and/or complexity. Accordingly, while these conventional vehicle road grade estimation techniques do work well for their intended purpose, there exists an opportunity for improvement in the relevant art.

SUMMARY

According to one example aspect of the invention, a road grade estimation system and a road grade estimation method for a vehicle are presented. In one exemplary implementation, the system and method utilize a set of sensors comprising an accelerometer configured to measure a longitudinal acceleration of the vehicle, a gyroscope configured to measure an angular pitch rate of the vehicle, and a velocity sensor configured to measure a longitudinal velocity of the vehicle, and a controller configured to: implement a Kalman filter that utilizes pitch rate as an input to estimate longitudinal acceleration and longitudinal velocity, receive, from the set of sensors, the measured longitudinal acceleration, angular pitch rate, and longitudinal velocity of the vehicle, estimate a grade of a road along which the vehicle is traveling using the implemented Kalman filter and the measured longitudinal acceleration, angular pitch rate, and longitudinal velocity of the vehicle, and control at least one operating parameter of the vehicle based on the estimated road grade.

In some implementations, the controller is configured to estimate the road grade using only the Kalman filter and the measured longitudinal acceleration, angular pitch rate, and longitudinal velocity of the vehicle. In some implementations, the Kalman filter is based on the following second-order state space model of the set of sensors:

$$\dot{x} = Ax + Bu + w,$$
$$y = Cx + v,$$

where $$x = [x_1 \ x_2]^T, w = [w_1 \ w_2]^T,$$
$$A = \begin{bmatrix} 0 & 1 \\ 0 & 0 \end{bmatrix}, B = \begin{bmatrix} 1 \\ 0 \end{bmatrix}, C = [1 \ 0]$$

where Cx represents the road grade or vehicle pitch angle to be estimated, u represents the measured angular pitch rate, y represents a combination of the measured longitudinal acceleration and velocity, and w and v are indicative of biases and noises of the set of sensors.

In some implementations, the controller is configured to estimate the road grade using a time-varying method comprising: determining a stabilizing solution P by solving the differential Riccati equation $\dot{P}=AP+PA^T-PC^TR^{-1}CP+Q$ with initial value P(0) being equal to the covariance of the initial state x(0) online in real-time, where Q and R are the covariances of w and v, respectively, and P is a matrix that represents the covariance of the error $x-\hat{x}$, determining a gain L of the Kalman filter as $L=-PC^TR^{-1}$, and estimating the road grade by solving the second-order state space model:

$$\dot{\hat{x}} = A\hat{x} + Bu - L(y - C\hat{x}),$$
$$\hat{y} = C\hat{x},$$

with zero initial condition.

In some implementations, the controller is configured to estimate the road grade using a time-invariant method comprising: determining a solution P by solving the algebraic Riccati equation $AP+PA^T-PC^TR^{-1}CP+Q=0$, where Q and R are the covariances of w and v, respectively, determining a gain L of the Kalman filter as $L=-PC^TR^{-1}$, and estimating the road grade by solving the second-order state space model:

$$\dot{\hat{x}} = A\hat{x} + Bu - L(y - C\hat{x}),$$
$$\hat{y} = C\hat{x},$$

with zero initial condition.

In some implementations, the controller is configured to estimate the road grade using a time-invariant method comprising: determining a solution P by solving the algebraic Riccati equation $AP+PA^T-PC^TR^{-1}CP+Q=0$, where Q and R are the covariances of w and v, and determining a gain L of the Kalman filter with the following:

$$P = \begin{bmatrix} p_{11} & p_{12} \\ p_{12} & p_{22} \end{bmatrix}, Q = \begin{bmatrix} q_{11} & 0 \\ 0 & q_{22} \end{bmatrix}, R = [r], L = \begin{bmatrix} l_1 \\ l_2 \end{bmatrix},$$

$$l_1 = -\left[\frac{q_{11} + 2(q_{22}r)^{1/2}}{r}\right]^{1/2}, l_2 = -\left(\frac{q_{22}}{r}\right)^{1/2},$$

and estimating the road grade by filtering the measurements of the set of sensors using complementary low-pass and high-pass filters:

$$\hat{Y}(s) = \frac{-l_1 s - l_2}{s^2 - l_1 s - l_2} Y(s) + \frac{s}{s^2 - l_1 s - l_2} U(s),$$

where $\hat{Y}(s)$, Y(s) and U(s) are the Laplace transforms of $\hat{y}(t)$, y(t) and u(t), respectively.

In some implementations, the at least one operating parameter of the vehicle corresponds to a vehicle efficiency system or a vehicle safety system. In some implementations, the vehicle efficiency system corresponds to at least one of torque optimization, torque splitting, battery management, transmission shift scheduling, fuel tank distance-to-empty prediction, and cruise control. In some implementations, the vehicle safety system corresponds to at least one of anti-lock braking, active suspension control, free fall detection, unintended acceleration/deceleration detection, rollover detection, collision avoidance, stability control, and autonomous driving.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously mentioned, there exists an opportunity for more accurate/reliable and faster vehicle road grade estimation techniques. Accordingly, Kalman filter based road grade estimation techniques using accelerometer, a gyroscope, and vehicle velocity are presented. The accelerometer measures the longitudinal proper acceleration of the vehicle, and the accelerometer measurement is almost drift free but it is heavily corrupted by the accelerometer noise. The gyroscope, on the other hand, measures the angular pitch rate of the vehicle, and the gyroscope measurement is quite clean but it is substantially disturbed by the gyroscope bias. Thus, the accelerometer and the gyroscope have complementary characteristics. Lastly, the velocity sensor measures the longitudinal velocity of the vehicle, and the velocity sensor measurement is also considerably corrupted by the measurement noise.

The proposed Kalman filter based estimation techniques of the present disclosure uses the models of the sensors and their outputs, and fuses the sensor measurements to optimally estimate the road grade. In one exemplary implementation, these techniques estimate road grade using only the Kalman filter and these three sensor inputs. The proposed Kalman filter formulation is unique in that it uses a mathematical model of the sensors where the gyroscope output is considered as the input and the combined accelerometer and velocity sensor output is considered as the output of the model whose states are to be estimated. By using this unique second-order state space model, a Kalman filter based estimation algorithm is developed to estimate road grade accurately in real time. This estimated road grade could then be utilized by various vehicle efficiency and/or safety systems to improve vehicle efficiency (e.g., fuel economy) and/or vehicle safety (e.g., anti-lock braking).

Figure 1:
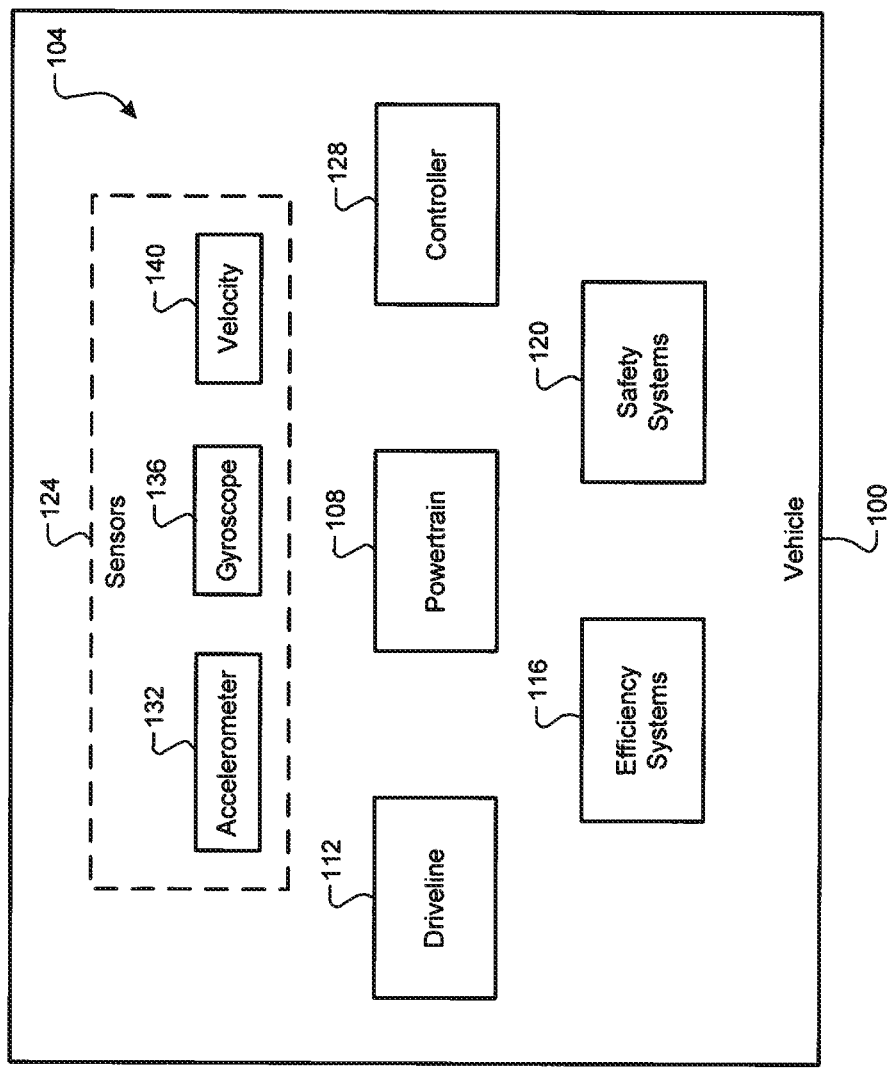
FIG. 1 is a functional block diagram of a vehicle having an example road grade estimation system according to the principles of the present disclosure.

Referring now to FIG. 1, a functional block diagram of a vehicle 100 having an example road grade estimation system 104 is illustrated. The vehicle 100 comprises a powertrain 108 (an engine, an electric motor, combinations thereof, etc.) that generates and transfers drive torque (e.g., via a transmission) to a driveline 112 for vehicle propulsion. The vehicle 100 comprises a set of efficiency systems 116 and a set of safety systems 120 that control or adjust various vehicle operating parameters to optimize vehicle efficiency and/or improve vehicle safety. The vehicle 100 further comprises a set of sensors 124 and a controller 128 that controls operation of the vehicle 100. The set of sensors 124 comprises at least a longitudinal accelerometer 132, an angular pitch rate gyroscope 136, and a velocity sensor 140. In one exemplary implementation, sensors 132 and 136 are collectively implemented on a nine-axis degree of freedom (DOF) inertial measurement unit (IMU) sensor chip. This IMU sensor chip comprises (1) a three-axis accelerometer, (2) a three-axis gyroscope, and (3) a three-axis magnetometer. While not shown, it will be appreciated that the set of sensors 124 could comprise other suitable vehicle sensors.

Non-limiting examples of the functionality performed by the vehicle efficiency systems include torque optimization, torque splitting, battery management, transmission shift scheduling, fuel tank distance-to-empty prediction, and cruise control. Similarly, non-limiting examples of the functionality performed by the vehicle safety systems include anti-lock braking, active suspension control, free fall detection, unintended acceleration/deceleration detection, rollover detection, collision avoidance, stability control, and autonomous driving. For example only, the estimated road grade could be utilized to determine engine loading, to estimate wheel slip, and/or to select a next transmission gear. It will be appreciated that these are non-limiting examples and that the estimated road grade could be utilized for any other suitable vehicle functionality. It will also be appreciated that at least some of the above-described functionality could be executed by the controller 128, either alone or in coordination with the above-described systems. The specific road grade estimation techniques will now be described in greater detail with reference to FIG. 2.

Figure 2:
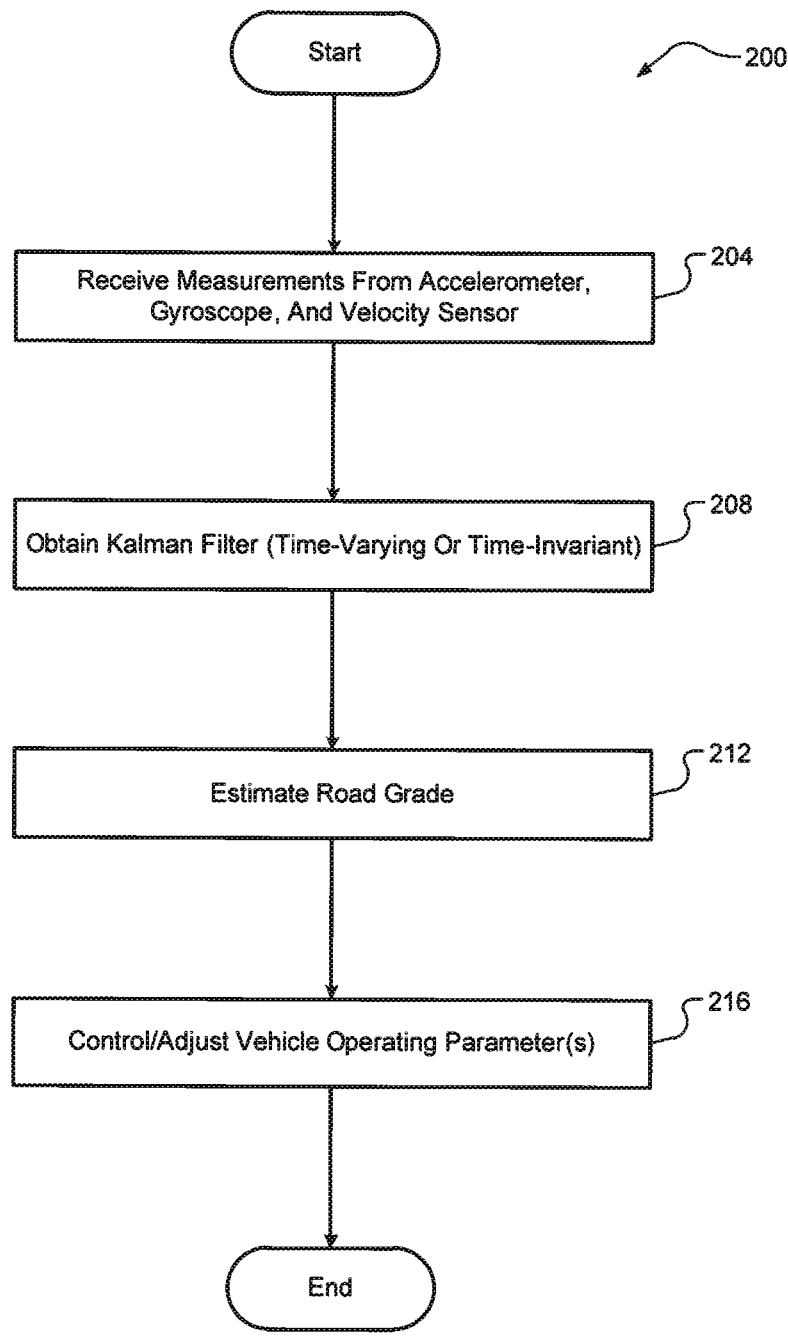
FIG. 2 is a flow diagram of an example vehicle road grade estimation method according to the principles of the present disclosure.
Figure 3:
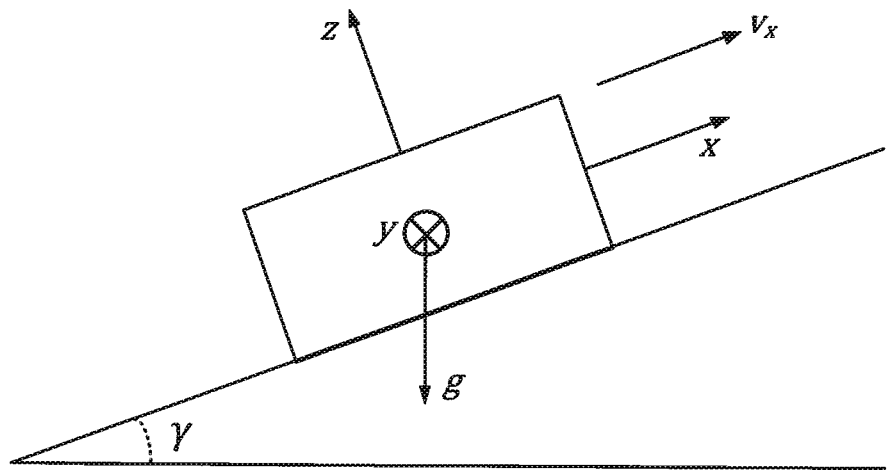
FIG. 3 illustrates a diagram of an example vehicle on a road grade according to the principles of the present disclosure.
Figure 4:
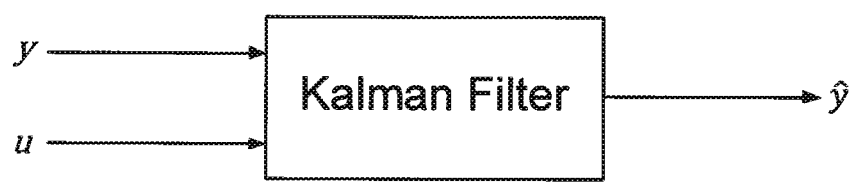
FIG. 4 illustrates a functional block diagram of an example Kalman filter based road grade estimation system according to the principles of the present disclosure.

Referring now to FIG. 2 and also with reference to FIGS. 3-4, a flow diagram of a road grade estimation method 200 for a vehicle is illustrated. While described with respect to specific components of vehicle 100, it will be appreciated that the road grade estimation method 200 could be applicable to any suitable vehicle. It is assumed that the vehicle is equipped with a longitudinal (x axis) accelerometer, an angular pitch rate (y axis) gyroscope, and a longitudinal (x axis) velocity sensor. In FIG. 3, an example diagram of the vehicle on an inclined road is shown, where $v_x$ is the longitudinal velocity of the vehicle, g is the gravitational acceleration, $\gamma$ is the road grade angle, and x-y-z is a body-fixed reference frame. At 204, the controller 128 receives measurements from the set of sensors 124. Specifically, the controller 128 receives (i) a measured longitudinal acceleration from the accelerometer 132, (ii) a measured angular pitch rate from the gyroscope 136, and (iii) a measured longitudinal velocity from the velocity sensor 140.

The accelerometer 132 can be modeled as:

$$a_x = \dot{v}_x + g \sin \gamma + n_{a_x}, \quad (1)$$

where $a_x$ is the accelerometer output, $\dot{v}_x$ is the longitudinal acceleration of the vehicle, and $n_{a_x}$ is the accelerometer measurement noise. The gyroscope 136 can be modeled as:

$$\omega_y = -\dot{\gamma} + b_y + n_{\omega_y},$$

$$\dot{b}_y = n_{b_y}, \quad (2)$$

where $\omega_y$ is the gyroscope output, $b_y$ is the gyroscope bias, $n_{\omega_y}$ is the gyroscope measurement noise, and $n_{b_y}$ is the bias noise. Lastly, the velocity sensor 140 can be modeled as:

$$s_x = v_x + n_{s_x}, \qquad (3)$$

where $s_x$ is the velocity sensor output, $v_x$ is the longitudinal velocity of the vehicle, and $n_{s_x}$ is the velocity sensor measurement noise.

Defining $\theta = -\gamma$ and noting that $\sin \gamma \approx \gamma$ when $\gamma$ is small, it follows that:

$$\theta_{as} = \theta + w_{as},$$

$$\omega_g = \dot{\theta} + b + w_g,$$

$$\dot{b} = w_b, \qquad (4)$$

where $\theta_{as} = (\dot{s}_x - a_x)/g$ is the measured pitch angle, $\theta = -\gamma$ is the actual pitch angle, $\omega_g = \omega_y$ is the measured angular pitch rate, $b = b_y$ is the gyroscope bias, $w_{as} = (\dot{n}_{s_x} - n_{a_x})/g$ is the combined accelerometer and velocity sensor noise, $w_g = n_{\omega_y}$ is the gyroscope noise, and $w_b = n_{b_y}$ is the bias noise. Letting $x_1 = \theta$, $x_2 = -b$, $u = \omega_g$, $y = \theta_{as}$, $w_1 = -w_g$, $w_2 = -w_b$, and $v = w_{as}$, the above equations can be written in state-space form as:

$$\dot{x}_1 = x_2 + u + w_1,$$

$$\dot{x}_2 = w_2,$$

$$y = x_1 + v, \qquad (5)$$

or compactly as:

$$\dot{x} = Ax + Bu + w, \qquad (6)$$
$$y = Cx + v,$$
where:

$$x = [x_1 \; x_2]^T, \; w = [w_1 \; w_2]^T, \qquad (7)$$
$$A = \begin{bmatrix} 0 & 1 \\ 0 & 0 \end{bmatrix}, \; B = \begin{bmatrix} 1 \\ 0 \end{bmatrix}, \; C = [1 \; 0].$$

This second order state-space model can then be utilized to develop the Kalman filter based estimator.

With these notations, the road grade estimation problem is to estimate the pitch angle $\theta$ using the measurements $\theta_{as}$ (from the accelerometer 132 and the velocity sensor 140) and $\omega_g$ (from the gyroscope 136) or, equivalently, estimate the output $Cx$ (road grade or pitch angle) using the input $u$ (output of the gyroscope 136) and the output $y$ (combined output of the accelerometer 132 and the velocity sensor 140). As previously discussed, it is known that the combined measurement provided by the accelerometer 132 and the velocity sensor 140 is almost drift free but substantially corrupted by the measurement noise due especially to the accelerometer measurement noise while the measurement provided by the gyroscope 136 is quite clean but considerably disturbed by the gyroscope bias. Equivalently, the combined accelerometer and velocity sensor measurement has a good low frequency characteristic while the gyroscope measurement has a good high frequency characteristic. Since these two measurements have complementary characteristics, they can be combined to obtain a better estimate of the road grade. For purposes of this disclosure, it is also assumed that w and v are uncorrelated zero-mean Gaussian white noise processes. Although this assumption is not strictly true, it is a fairly plausible assumption and it is usually satisfied approximately for the sensors considered.

At 208, the controller 128 obtains the measurements from the sensors, and uses a Kalman filter to fuse these measurements to estimate the road grade. The road grade estimation problem is solved using the standard Kalman filter estimation theory using the specifically developed unique mathematical model for this purpose. Both time-varying and time-invariant Kalman estimators are obtainable analytically. A simplified special case of the time-invariant Kalman filter estimator is also obtainable. The Kalman filter is an optimal method to estimate the true values of signals from imperfect measurements containing noises and other inaccuracies as encountered by conventional road grade estimation methods. It produces the estimated values from a weighted average of measurements and predictions by weighting the values with the least uncertainty (measured by the covariances of the signals) more. The Kalman filter uses the model of the system, its controlled input and measured output to form an optimal estimate of the road grade that is better than the estimate obtained by using any one of them alone.

Letting the covariances of w and v be Q and R, respectively, the Kalman filter to estimate the output $Cx$ is characterized by $$\dot{\hat{x}} = A\hat{x} + Bu - L(y - C\hat{x}),$$

$$\hat{y} = C\hat{x}, \qquad (8)$$

where $\hat{x}$ is the estimate of the state $x$ (pitch angle and gyroscope bias), $\hat{y}$ is the estimate of $Cx$ (pitch angle), $L$ is the Kalman gain $$L = -PC^T R^{-1}, \qquad (9)$$

and $P$ is the stabilizing solution of the differential Riccati equation $$\dot{P} = AP + PA^T - PC^T R^{-1} CP + Q \qquad (10)$$

with the initial value $P(0)$ being equal to the covariance of the initial state $x(0)$. The matrix $P$ is the covariance of the error $x - \hat{x}$. This form of the Kalman filter is called the time-varying Kalman filter.

Since the model of the system is time-invariant, $\dot{P} = 0$ in the steady-state and the differential Riccati equation in this case reduces to the algebraic Riccati equation:

$$AP + PA^T - PC^T R^{-1} CP + Q = 0. \qquad (11)$$

This resulting simplified form of the Kalman filter is called the time-invariant (or steady state) Kalman filter. Moreover, it follows that $$\hat{Y}(s) = -C(sI - A - LC)^{-1} LY(s) + C(sI - A - LC)^{-1} BU(s), \qquad (12)$$

where $\hat{Y}(s)$, $Y(s)$ and $U(s)$ are the Laplace transforms of $\hat{y}(t)$, $y(t)$ and $u(t)$, respectively. Hence, the road grade can be estimated from the measurements using the Kalman filter described above as shown in FIG. 4.

Assuming that $w_1$ and $w_2$ are also uncorrelated, the time-invariant Kalman filter estimator can be further simplified. With:

$$P = \begin{bmatrix} p_{11} & p_{12} \\ p_{12} & p_{22} \end{bmatrix}, \; Q = \begin{bmatrix} q_{11} & 0 \\ 0 & q_{22} \end{bmatrix}, \; R = [r], \; L = \begin{bmatrix} l_1 \\ l_2 \end{bmatrix}, \qquad (13)$$

it follows that:

$$l_1 = -\left[\frac{q_{11} + 2(q_{22}r)^{1/2}}{r}\right]^{1/2}, \quad (14)$$

$$l_2 = -\left(\frac{q_{22}}{r}\right)^{1/2},$$

and:

$$\hat{Y}(s) = \frac{-l_1 s - l_2}{s^2 - l_1 s - l_2} Y(s) + \frac{s}{s^2 - l_1 s - l_2} U(s). \quad (15)$$

Note that this Kalman filter is also equivalent to using the optimal low-pass filter:

$$F(s) = \frac{-l_1 s - l_2}{s^2 - l_1 s - l_2} \quad (16)$$

and the complementary high-pass filter:

$$1 - F(s) = \frac{s^2}{s^2 - l_1 s - l_2}. \quad (17)$$

Note further that the estimated road grade or pitch angle is formed by combining the low-pass filtered pitch angle estimate obtained from the accelerometer and velocity sensor with the high-pass filtered pitch angle estimate obtained from the gyroscope 136 as expected.

At 212, the controller 128 estimates the grade of a road along which the vehicle is traveling using the Kalman filter (time-varying or one of the time-invariant versions) and the measured longitudinal acceleration, angular pitch rate, and longitudinal velocity of the vehicle as described above. Lastly, at 216, the controller 128 controls at least one operating parameter of the vehicle based on the estimated road grade. As previously discussed, this could include controlling at least one operating parameter of the vehicle corresponding to the vehicle efficiency system(s) 116 or the vehicle safety system(s) 120, including, but not limited to, torque optimization, torque splitting, battery management, transmission shift scheduling, fuel tank distance-to-empty prediction, cruise control, anti-lock braking, active suspension control, free fall detection, unintended acceleration/deceleration detection, rollover detection, collision avoidance, stability control, and autonomous driving. The method 200 then ends or returns to 204 for one or more additional cycles.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A road grade estimation system for a vehicle, the road grade estimation system comprising:
    a set of sensors including:
        an accelerometer configured to measure a longitudinal acceleration of the vehicle,
        a gyroscope configured to measure an angular pitch rate of the vehicle, and
        a velocity sensor configured to measure a longitudinal velocity of the vehicle; and
    a controller configured to:
        implement a Kalman filter that utilizes pitch rate as an input to estimate longitudinal acceleration and longitudinal velocity of the vehicle,
        receive, from the set of sensors, the measured longitudinal acceleration, angular pitch rate, and longitudinal velocity of the vehicle,
        estimate a grade of a road along which the vehicle is traveling using only the implemented Kalman filter and the measured longitudinal acceleration, angular pitch rate, and longitudinal velocity of the vehicle, and biases and noises of the set of sensors, and
        control at least one operating parameter of the vehicle based on the estimated road grade.

2. The road grade estimation system of claim 1, wherein the Kalman filter is based on the following second-order state space model of the set of sensors:

$$\dot{x} = Ax + Bu + w,$$
$$y = Cx + v,$$

where $$x = [x_1 \; x_2]^T, \; w = [w_1 \; w_2]^T,$$
$$A = \begin{bmatrix} 0 & 1 \\ 0 & 0 \end{bmatrix}, B = \begin{bmatrix} 1 \\ 0 \end{bmatrix}, C = [1 \; 0]$$

where Cx represents the road grade to be estimated, u represents the measured angular pitch rate of the vehicle, y represents a combination of the measured longitudinal acceleration and longitudinal velocity of the vehicle, and w and v are indicative of the biases and noises of the set of sensors.

3. The road grade estimation system of claim 2, wherein the controller is further configured to estimate the road grade using a time-invariant method comprising:
    determining a solution P by solving the algebraic Riccati equation $AP+PA^T-PC^TR^{-1}CP+Q=0$, where Q and R are the covariances of w and v, and determining a gain L of the Kalman filter with the following:

$$P = \begin{bmatrix} p_{11} & p_{12} \\ p_{12} & p_{22} \end{bmatrix}, Q = \begin{bmatrix} q_{11} & 0 \\ 0 & q_{22} \end{bmatrix}, R = [r], L = \begin{bmatrix} l_1 \\ l_2 \end{bmatrix},$$

$$l_1 = -\left[\frac{q_{11} + 2(q_{22}r)^{1/2}}{r}\right]^{1/2}, l_2 = -\left(\frac{q_{22}}{r}\right)^{1/2};$$

and
    estimating the road grade by filtering the measurements of the set of sensors using complementary low-pass and high-pass filters:

$$\hat{Y}(s) = \frac{-l_1 s - l_2}{s^2 - l_1 s - l_2} Y(s) + \frac{s}{s^2 - l_1 s - l_2} U(s),$$

where $\hat{Y}(s)$, $Y(s)$ and $U(s)$ are the Laplace transforms of $\hat{y}(t)$, $y(t)$ and $u(t)$, respectively.

4. The road grade estimation system of claim 2, wherein the controller is further configured to estimate the road grade using a time-varying method comprising:
 determining a stabilizing solution P by solving the differential Riccati equation $\dot{P}=AP+PA^T-PC^TR^{-1}CP+Q$ with initial value P(0) being equal to the covariance of the initial state x(0) online in real-time, where Q and R are the covariances of w and v, respectively, and P is a matrix that represents the covariance of the error $x-\hat{x}$;
 determining a gain L of the Kalman filter as $L=-PC^TR^{-1}$; and
 estimating the road grade by solving the second-order state space model:

$$\dot{\hat{x}}=A\hat{x}+Bu-L(y-C\hat{x}),$$

$$\hat{y}=C\hat{x},$$

with zero initial condition.

5. The road grade estimation system of claim 2, wherein the controller is further configured to estimate the road grade using a time-invariant method comprising:
 determining a solution P by solving the algebraic Riccati equation $AP+PA^T-PC^TR^{-1}CP+Q=0$, where Q and R are the covariances of w and v, respectively;
 determining a gain L of the Kalman filter as $L=-PC^TR^{-1}$; and
 estimating the road grade by solving the second-order state space model:

$$\dot{\hat{x}}=A\hat{x}+Bu-L(y-C\hat{x}),$$

$$\hat{y}=C\hat{x},$$

with zero initial condition.

6. The road grade estimation system of claim 1, wherein the at least one operating parameter of the vehicle corresponds to a vehicle efficiency system or a vehicle safety system.

7. The road grade estimation system of claim 6, wherein the vehicle safety system corresponds to at least one of anti-lock braking, active suspension control, free fall detection, unintended acceleration/deceleration detection, rollover detection, collision avoidance, stability control, and autonomous driving.

8. The road grade estimation system of claim 6, wherein the vehicle efficiency system corresponds to at least one of torque optimization, torque splitting, battery management, transmission shift scheduling, fuel tank distance-to-empty prediction, and cruise control.

9. A road grade estimation method for a vehicle, the road grade estimation method comprising:
 receiving, by a controller and from a set of sensors, measured longitudinal acceleration, angular pitch rate, and longitudinal velocity of the vehicle, wherein the set of sensors comprises an accelerometer configured to measure the longitudinal acceleration of the vehicle, a gyroscope configured to measure the angular pitch rate of the vehicle, and a velocity sensor configured to measure a longitudinal velocity of the vehicle;
 implementing, by the controller, a Kalman filter that utilizes pitch rate as an input to estimate longitudinal acceleration and longitudinal velocity of the vehicle;
 estimating, by the controller, a grade of a road along which the vehicle is traveling using only the implemented Kalman filter and the measured longitudinal acceleration, angular pitch rate, and longitudinal velocity of the vehicle, and biases and noises of the set of sensors; and
 controlling, by the controller, at least one operating parameter of the vehicle based on the estimated road grade.

10. The road grade estimation method of claim 9, wherein the at least one operating parameter of the vehicle corresponds to a vehicle efficiency system or a vehicle safety system.

11. The road grade estimation method of claim 10, wherein the vehicle efficiency system corresponds to at least one of torque optimization, torque splitting, battery management, transmission shift scheduling, fuel tank distance-to-empty prediction, and cruise control.

12. The road grade estimation method of claim 10, wherein the vehicle safety system corresponds to at least one of anti-lock braking, active suspension control, free fall detection, unintended acceleration/deceleration detection, rollover detection, collision avoidance, stability control, and autonomous driving.

13. The road grade estimation method of claim 9, wherein the Kalman filter is based on the following second-order state space model of the set of sensors:

$$\dot{x} = Ax + Bu + w,$$
$$y = Cx + v,$$

where $$x = [x_1 \ x_2]^T, w = [w_1 \ w_2]^T,$$

$$A = \begin{bmatrix} 0 & 1 \\ 0 & 0 \end{bmatrix}, B = \begin{bmatrix} 1 \\ 0 \end{bmatrix}, C = [1 \ 0]$$

where Cx represents the road grade to be estimated, u represents the measured angular pitch rate of the vehicle, y represents a combination of the measured longitudinal acceleration and longitudinal velocity of the vehicle, and w and v are indicative of the biases and noises of the set of sensors.

14. The road grade estimation system of claim 13, estimating the road grade further comprises using, by the controller, a time-invariant method comprising:
 determining a solution P by solving the algebraic Riccati equation $AP+PA^T-PC^TR^{-1}CP+Q=0$, where Q and R are the covariances of w and v, respectively;
 determining a gain L of the Kalman filter as $L=-PC^TR^{-1}$; and
 estimating the road grade by solving the second-order state space model:

$$\dot{\hat{x}}=A\hat{x}+Bu-L(y-C\hat{x}),$$

$$\hat{y}=C\hat{x},$$

with zero initial condition.

15. The road grade estimation method of claim 13, wherein estimating the road grade further comprises using, by the controller, a time-invariant method comprising:
 determining a solution P by solving the algebraic Riccati equation $AP+PA^T-PC^TR^{-1}CP+Q=0$, where Q and R are the covariances of w and v, and determining the gain L of the Kalman filter with the following:

$$P = \begin{bmatrix} p_{11} & p_{12} \\ p_{12} & p_{22} \end{bmatrix}, Q = \begin{bmatrix} q_{11} & 0 \\ 0 & q_{22} \end{bmatrix}, R = [r], L = \begin{bmatrix} l_1 \\ l_2 \end{bmatrix},$$

$$l_1 = -\left[\frac{q_{11} + 2(q_{22}r)^{1/2}}{r}\right]^{1/2}, l_2 = -\left(\frac{q_{22}}{r}\right)^{1/2};$$

and estimating the road grade by filtering the measurements of the set of sensors using complementary low-pass and high-pass filters:

$$\hat{Y}(s) = \frac{-l_1 s - l_2}{s^2 - l_1 s - l_2} Y(s) + \frac{s}{s^2 - l_1 s - l_2} U(s),$$

where $\hat{Y}(s)$, $Y(s)$ and $U(s)$ are the Laplace transforms of $\hat{y}(t)$, $y(t)$ and $u(t)$, respectively.

16. The road grade estimation method of claim 13, estimating the road grade further comprises using, by the controller, a time-varying method comprising:

determining a stabilizing solution P by solving the differential Riccati equation $\dot{P}=AP+PA^T-PC^TR^{-1}CP+Q$ with initial value P(0) being equal to the covariance of the initial state x(0) online in real-time, where Q and R are the covariances of w and v, respectively, and P is a matrix that represents the covariance of the error $x-\hat{x}$;

determining a gain L of the Kalman filter as $L=-PC^TR^{-1}$; and estimating the road grade by solving the second-order state space model:

$\dot{\hat{x}}=A\hat{x}+Bu-L(y-C\hat{x}),$ $\hat{y}=C\hat{x},$ with zero initial condition.

* * * * *